United States Patent
Campillo et al.

(10) Patent No.: US 9,569,010 B2
(45) Date of Patent: Feb. 14, 2017

(54) GESTURE-BASED HUMAN MACHINE INTERFACE

(75) Inventors: David Esteban Campillo, Madrid (ES); David Luis Scarlatti Jimenez, Madrid (ES); Nicolas Pena Ortiz, Madrid (ES); Pablo Soriano Tapia, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 159 days.

(21) Appl. No.: 13/149,462

(22) Filed: May 31, 2011

(65) Prior Publication Data

US 2011/0304650 A1  Dec. 15, 2011

(30) Foreign Application Priority Data

Jun. 9, 2010  (EP) ..................................... 10382168

(51) Int. Cl.
*G06F 3/03*  (2006.01)

(52) U.S. Cl.
CPC ................... *G06F 3/0304* (2013.01)

(58) Field of Classification Search
CPC .................................................. G06F 3/0304
USPC ........................................................ 345/661
See application file for complete search history.

(56) References Cited

U.S. PATENT DOCUMENTS

| | | | | |
|---|---|---|---|---|
| 7,348,963 | B2 * | 3/2008 | Bell | 345/156 |
| 2002/0036617 | A1 * | 3/2002 | Pryor | 345/156 |
| 2004/0233222 | A1 * | 11/2004 | Lee | G06F 3/0481 345/621 |
| 2007/0146347 | A1 * | 6/2007 | Rosenberg | 345/173 |
| 2007/0216642 | A1 | 9/2007 | Kneissler | |
| 2009/0254855 | A1 | 10/2009 | Kretz et al. | |
| 2010/0090964 | A1 * | 4/2010 | Soo et al. | 345/173 |
| 2010/0120535 | A1 | 5/2010 | Asami | |
| 2010/0246571 | A1 * | 9/2010 | Geppert | G06F 3/04817 370/352 |
| 2010/0271400 | A1 * | 10/2010 | Suzuki | G06F 3/017 345/660 |
| 2010/0306670 | A1 * | 12/2010 | Quinn et al. | 715/753 |
| 2011/0102464 | A1 * | 5/2011 | Godavari | 345/650 |
| 2011/0151974 | A1 * | 6/2011 | Deaguero | 463/37 |

(Continued)

FOREIGN PATENT DOCUMENTS

| | | |
|---|---|---|
| CN | 101040242 A | 9/2007 |
| CN | 101636207 A | 1/2010 |

(Continued)

OTHER PUBLICATIONS

EP search report dated Dec. 28, 2010 regarding application 10382168.2, reference BOE/P109762EP00, applicant The Boeing Company, 6 Pages.

(Continued)

*Primary Examiner* — James A Thompson
(74) *Attorney, Agent, or Firm* — Yee & Associates, P.C.

(57) ABSTRACT

A gesture-based human machine interface, for example, a user interface for controlling a program executing on a computer, and related method are provided. Gestures of the user are monitored and a response is provided that is based upon the detected gestures. An object is used to point to information displayed on a screen. The information displayed on the screen is modified in response to a determination of the position on the screen to which the object is pointing and in response to the distance of the object from the screen.

20 Claims, 6 Drawing Sheets

(56) References Cited

U.S. PATENT DOCUMENTS

2012/0200571 A1\* 8/2012 Newell ................ G06F 3/1454
                                                                  345/428

FOREIGN PATENT DOCUMENTS

| EP | 1248227 A2 | 10/2002 |
| --- | --- | --- |
| JP | 2005322071 A | 11/2005 |
| JP | 2006293878 A | 10/2006 |
| JP | 2009116583 A | 5/2009 |
| JP | 2009151516 A | 7/2009 |

OTHER PUBLICATIONS

State Intellectual Property Office of PRC Notification of First Office Action and English translation, dated May 11, 2015, regarding Applicaition No. 201110115071.2, 23 pages.
English translation of Notice of Reasons for Rejection, dated Apr. 14, 2015, regarding Japanese Patent Application No. 2011-118571, 2 pages.
English translation of State Intellectual Property Office of PRC Notification of Second Office Action, dated Dec. 28, 2015, regarding Application No. 201110115071.2, 22 pages.

\* cited by examiner

GESTURE-BASED HUMAN MACHINE INTERFACE

RELATED PRIORITY APPLICATION

The present application is related to and claims the benefit of priority of EP Application No. 10382168.2 entitled "Gesture-Based Human Machine Interface," filed on Jun. 5, 2010, which is herein incorporated by reference.

BACKGROUND INFORMATION

1. Field

The present disclosure relates generally to a gesture-based human machine interface, for example a graphical user interface for controlling a program executing on a computer. Although applicable to many types of programs, programs controlling the flight of one or more unmanned air vehicles are of particular interest.

2. Background

Human machine interfaces have evolved substantially over the past decades. Even within the narrower field of control of computers, interfaces have evolved from command lines to graphical user interfaces requiring the use of a mouse or similar type of pointing device for selecting graphical icons displayed to a user.

More recently, touch screen devices have gained popularity. Touch screen devices allowing multiple points of input are particularly advantageous as they open up the possibility of gesture-based control. Apple's iPhone™ is a good example where touches may be used to select items, scroll up or down, zoom in or zoom out and to rotate items. Touch screen devices suffer several disadvantages. For example, the screens tend to have slow reaction times, poor accuracy and poor reliability, while frequent use of a touch screen leads to the accumulation of residues and dirt resulting in further deterioration of performance.

Systems that avoid some of the problems of touch screen devices have been proposed by avoiding contact with the screen. Instead, the gestures of the user are monitored and a response is provided that is based upon the detected gesture. For example, systems that monitor the hands of a user have been proposed, such that gestures made with the hands are used to select, scroll, zoom, rotate, and the like, akin to current systems that rely upon touching the screen.

It would be advantageous to have a method and apparatus that takes into account one or more of the issues discussed above, as well as possibly other issues.

SUMMARY

An illustrative embodiment of the present disclosure provides a method of using a computer system through a gesture-based human machine interface. An object is used to point to a position on a screen of the computer system. Images of the space in front of the screen, including the object, are captured with at least two cameras. A processor is used to analyze the images captured by the cameras to identify the object, to determine the position on the screen to which the object is pointing, and to determine a distance of the object from the screen. Information displayed on the screen is modified in response to the determination of both the position on the screen to which the object is pointing and the distance of the object from the screen.

Another illustrative embodiment provides an apparatus comprising a screen operable to display information, at least two cameras configured to capture images of a space in front of the screen, and a processor. The processor is configured to receive the images provided by the cameras, to analyze the images to identify an object pointing at a position on the screen, to determine the position on the screen to which the object is pointing, and to determine a distance of the object from the screen, and to modify the information displayed on the screen in response to the determination of both the position on the screen to which the object is pointing and the distance of the object from the screen.

Another illustrative embodiment provides a gesture-based human interface of a computer system. The interface includes a screen operable to display information, at least two cameras configured to capture images of a space in front of the screen, and a processor. The processor is configured to receive the images provided by the cameras, to analyze the images to identify an object pointing at a position on the screen, to determine the position on the screen to which the object is pointing, to determine a distance of the object from the screen, and to determine a speed of movement of the object, and to modify the information displayed on the screen in response to the determination of the position on the screen to which the object is pointing, the distance of the object from the screen, and the speed of movement.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
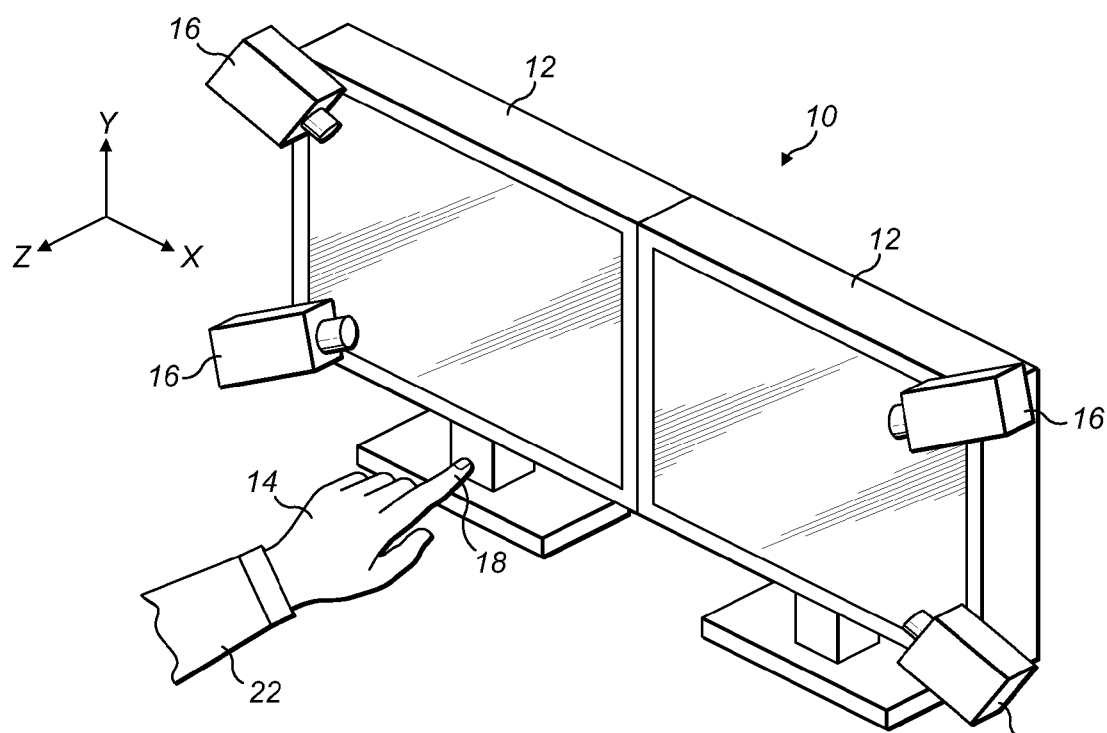
FIG. 1 is a perspective view of a system including a human machine interface according to an illustrative embodiment, the system comprising two side-by-side screens and four cameras.

Illustrative embodiments provide a method of using a computer system through a gesture-based human machine interface. The method comprises using an object to point to information displayed on a screen of the computer system, and capturing the scene in front of the screen with at least two cameras. A processor is used to analyze the scene captured by the cameras to identify the object, to determine where on the screen the object is pointing and the distance of the object from the screen. The processor then modifies the information displayed on the screen in response to the determination of to where the object is pointing and the distance of the object from the screen.

In this way, the disadvantages of touch screens may be avoided. Moreover, use is made of the information relating to how far away the object is from the screen. This information may be used in different ways. For example, the information displayed on the screen may be modified by zooming a portion of the screen to which the object is pointing with a magnification that is dependent upon the determined distance of the object from the screen. Hence, pointing close to the screen may be used to provide a greater magnification than pointing further away. Limits may be set, such that pointing further than a certain distance produces a magnification of unity, whereas magnification reaches a maximum value a set distance away from the screen. How magnification scales between these distances may be controlled to vary linearly or exponentially.

The method may comprise tracking movement of the object to determine where on the screen the object is pointing. The method may comprise determining a longitudinal extension of the object to determine where on the screen the object is pointing. These two optional features may be used as alternatives or they may be used to augment each other.

By determining the distance of the object from the screen over a period of time, the speed of movement of the object may be determined. This speed may be used as a further control of the information displayed on the screen. A rapid movement of the object towards the screen may be interpreted differently from a gradual movement of the object towards the screen. For example, a gradual movement may be interpreted as a single click whereas a rapid movement may be interpreted as a double click.

Optionally, the method may comprise using two objects to point to information displayed on a screen of the computer system, and capturing the scene in front of the screen with at least two cameras. The processor may be used to analyze the scene captured by the cameras to identify the objects, to determine where on the screen the objects are pointing and the distance of the objects from the screen. The processor then modifies the information displayed on the screen in response to the determination of to where the objects are pointing and the distance of the objects from the screen. This allows further functionality. For example, the pair of objects may be used independently to interact with different controls on the screen, for example to adjust a volume control and to zoom in on an area. The two objects may also be used together. An image displayed on the screen may be manipulated using the objects, such to rotate the object. For example, moving a left object towards the screen and a right object away from the screen may cause the image to rotate clockwise about a vertical axis. Moving an upper object towards the screen and a lower object away from the screen may cause the image to rotate about a horizontal axis. Other rotations are possible depending upon the relative alignment of the objects and the relative movement between the objects.

Many different objects may be used to point at the screen. For example, the object may be a user's hand. Preferably, the object may be an extended finger of the user's hand. In this case, the tip of the finger may be the point used to determine the distance from the screen. The extension of the finger may be used to determine to where on the screen the user is pointing.

Illustrative embodiments also provide a computer system including a gesture-based human machine interface. The computer system comprises a screen operable to display information, at least two cameras arranged to capture the scene in front of the screen, and a processor. The processor is configured to receive images provided by the cameras, and to analyze the images to identify an object pointing at information displayed on the screen. The processor also is configured to determine where on the screen the object is pointing and the distance of the object from the screen. The processor also is configured to modify the information displayed on the screen in response to the determination of to where the object is pointing and the distance of the object from the screen.

Optionally, the processor is configured to track movement of the object to determine where on the screen the object is pointing. In addition, or in the alternative, the processor may be configured to determine a longitudinal extension of the object to determine where on the screen the object is pointing. The processor may be configured to zoom a portion of the screen to which the object is pointing with a magnification that is dependent upon the determined distance of the object from the screen. Two objects may be used to modify the information displayed on the screen, as described above with respect to the method of the invention. The object may be a user's hand, such as the extended finger of a user's hand.

Turning first to FIG. 1, a perspective view of a system including a human machine interface according to an illustrative embodiment is presented. The computer system 10 includes one or more screens 12 that are driven to display information. The display of information may be controlled by a user through making gestures with his or her hands 14 in front of the screens 12. These gestures are recorded using four cameras 16 arranged around the screens 12. The images captured by the cameras 16 are analyzed to determine the position of a user's hand 14 in three dimensions and to track movement of the hand 14. Movements of the hand 14 are interpreted by the computer system 10, for example to identify gestures that correspond to selection of an icon displayed on the screens 12 or to zoom in on an area displayed on the screens 12. The computer system 10 changes the information displayed on the screens 12 in response to these gestures.

Figure 2:
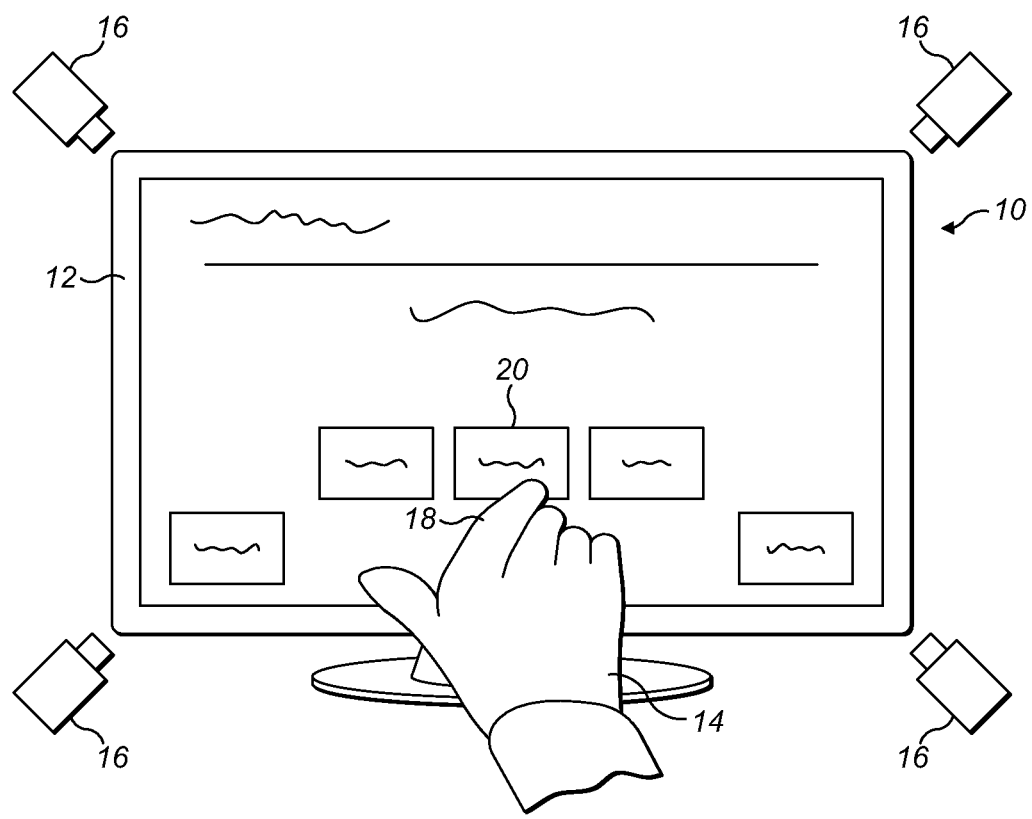
FIG. 2 is a perspective view of a screen from a user's point of view in accordance with an illustrative embodiment, showing the user selecting a button shown on the screen by pointing at the button.

Turning now to FIG. 2, a perspective view of a screen 12 from a user's point of view in accordance with an illustrative embodiment is presented. FIG. 2 shows an example where a user moves their index finger 18 forward towards a button 20 shown on a screen 12. This movement mimics the user pressing the button 20, and the computer system 10 interprets this as the user selecting the button 20. This may cause the computer system 10 to display a new view on the screen 12.

FIGS. 1 and 2 show a computer system 10 that uses two side-by-side screens 12, although any number of screens 12 may be used. A user's arm 22 is shown schematically in front of the screens 12. Movement of the arm 22 is captured by four cameras 16 that are arranged at the four outer corners of the screens 12, and that look in towards the centre of the screens 12. Thus, they capture movement of the user's hand 14 as it moves about in front of the screens 12. The use of four cameras 16 allows a three-dimensional map of the space in front of the screens 12 to be constructed. Thus, the position of an object, such as the tip of a user's finger 18 may be determined in an x, y, z co-ordinate system. These co-ordinate axes are indicated in FIGS. 1 and 3. Spatial information from all three x, y, z axes may be used in the human machine interface.

Figure 3A:
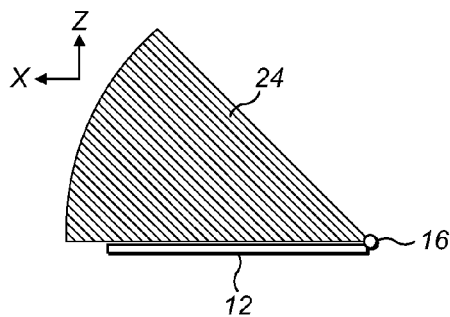
FIGS. 3A-3D are top views of a human machine interface according to an illustrative embodiment, showing how the fields of view of cameras combine in the system comprising a screen and one or more cameras.
Figure 3B:
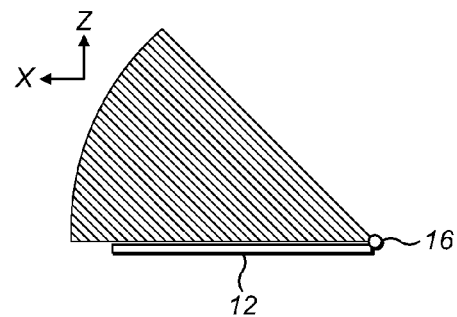
Figure 3C:
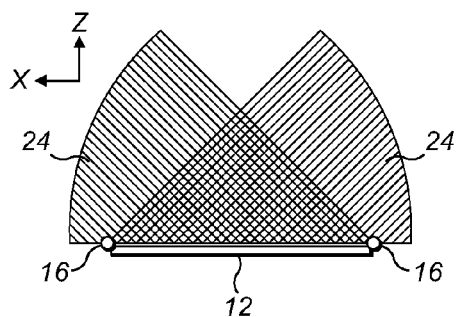
Figure 3D:
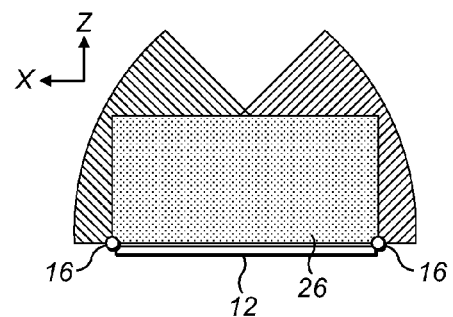
Figure 3E:
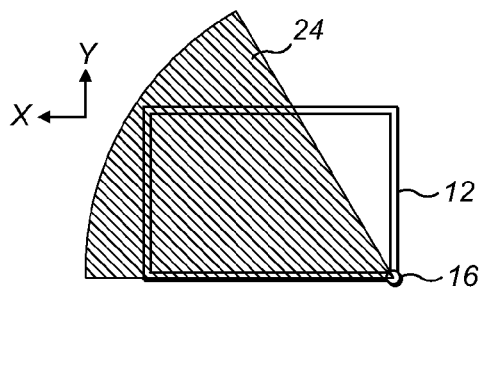
FIGS. 3E-3H are front views of the human machine interface shown in FIGS. 3A-3D, with FIGS. 3E-3H corresponding to FIGS. 3A-3D respectively.
Figure 3F:
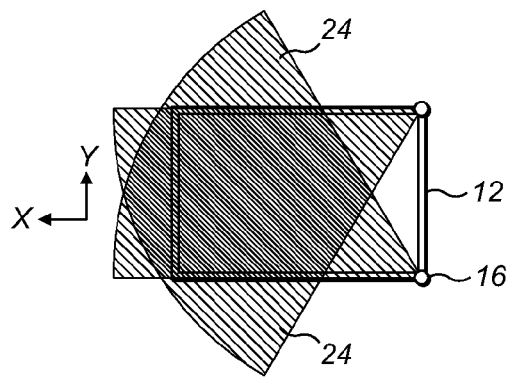
Figure 3G:
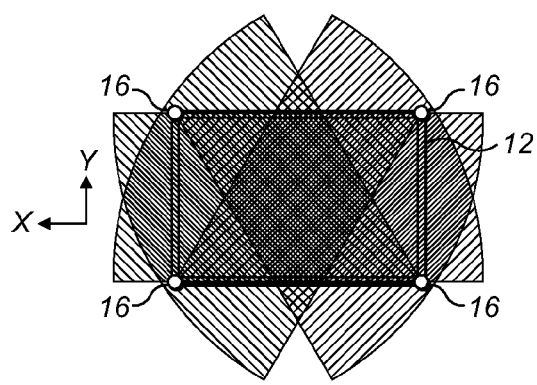
Figure 3H:
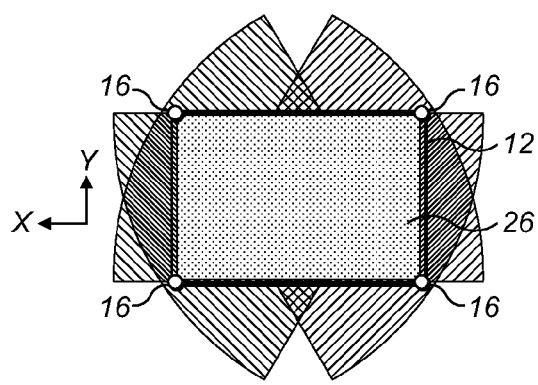

Turning now to FIGS. 3A-3H. FIGS. 3A-3D are top views of a human machine interface according to an illustrative embodiment. FIGS. 3E-3H are front views of the system shown in FIGS. 3A-3D, with FIGS. 3E-3H corresponding to FIGS. 3A-3D, respectively. FIGS. 3A-3H show how the field of view 24 of each of the cameras 16 combines to provide a volume of space within which the computer system 10 can determine the position of an object. FIGS. 3A and 3E are a plan view and a front view, respectively, of a single screen 12 showing just a single camera 16. The camera 16 is shown schematically as a dot for the sake of clarity. The cameras 16 are identical, and so have the same shape of field of view 24. Thus, FIGS. 3A and 3E illustrate well the shape of field of view 24 obtained from each of the cameras 16. FIGS. 3B and 3F are a plan view and a front view, respectively, of the same screen 12, this time showing two cameras 16 arranged on the right hand edge of the screen 12. These figures show how the field of view of the two cameras 16 combine. FIGS. 3C and 3G are plan and front views of the screen 12 with all four cameras 16 and their fields of view 24 shown. The position of an object in front of the screen 12 may be determined if it is captured within the field of view 24 of at least two cameras 16. Thus, the position of an object may be determined wherever there is overlap of fields of view 24. A core region of interest 26 within which an object's position may be determined is shown in FIGS. 3D and 3H.

Figure 4:
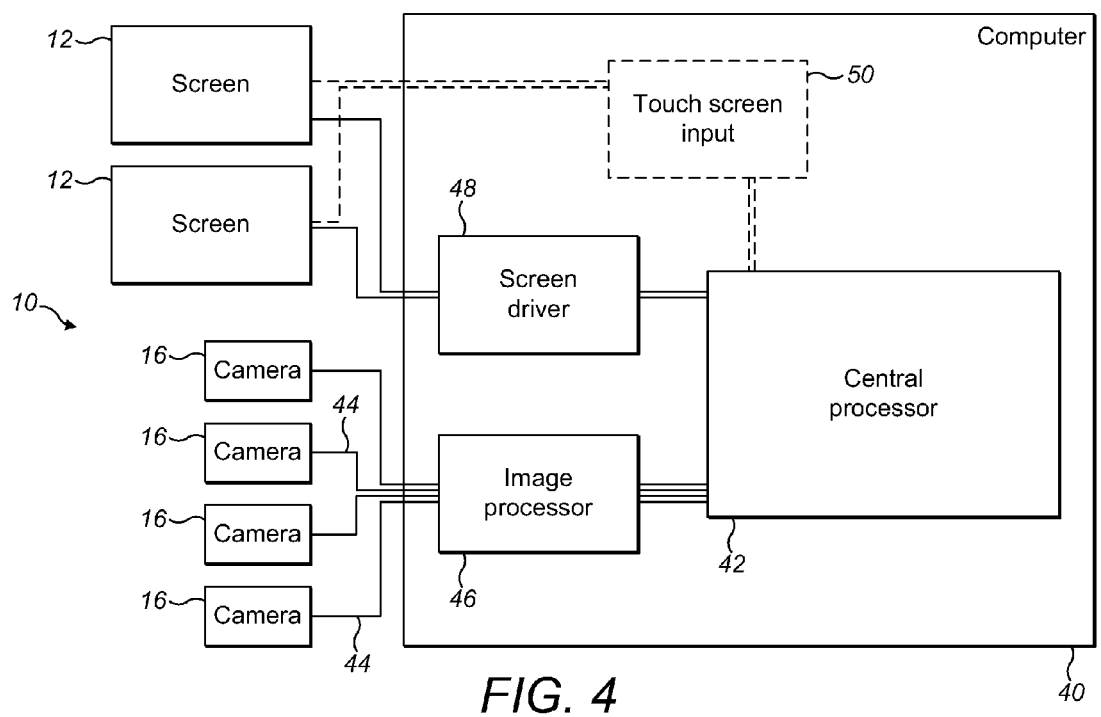
FIG. 4 is an illustration of a computer system with a human machine interface according to an illustrative embodiment.

Turning now to FIG. 4, an illustration of a computer system with a human machine interface according to an illustrative embodiment is presented. FIG. 4 shows the computer system 10 in more detail. The computer system 10 has a computer 40 as its hub. The computer 40 may comprise many different parts, for example a central processor 42, memory including programs stored therein such as drivers for peripherals like the screens 12, and cards for operating peripherals like the screens 12.

As can be seen, feeds 44 link the four cameras 16 to an image processor 46. The image processor 46 may be part of the central processor 42, or may be provided as a separate processor. Either way, the image processor 46 receives images from the cameras 16. The image processor 46 uses commonly available software to process the images to improve their quality. For example, brightness, contrast and sharpness may be improved such that better quality images result. The processed images are passed to the central processor 42. Image analysis software, stored in memory, is retrieved and run by the central processor 42 to analyze the processed images to determine where on the screens 12 the user is pointing. As will be appreciated, such image analysis software is commonly available.

Once the central processor 42 has determined to where on the screens the user is pointing, the central processor 42 determines whether the displays presented on the screens 12 needs to be changed. If the determination is positive, the central processor 42 generates the necessary signals to cause the necessary change in the information displayed on the screens 12. These signals are passed to a screen driver 48 that provides the actual signals that are supplied to the screens 12.

Computer 40 may comprise touch screen input 50 for receiving touch screen inputs from the screens 12. For example, touch screen input 50 allows selection of icons displayed on the screens 12 by a user touching the screens 12. Providing this feature may be useful in certain situations. For example, critical selections may require a user to touch a screen 12 as a further step to ensure the user is certain they want to make that selection. For example, this may be used for a button that causes an emergency shutdown of a system: clearly such action is extreme and the requirement for the user to touch a screen 12 may reflect this. Hence, the provision of the touch screen input 50.

As mentioned above, the central processor 42 takes the processed images provided by the image processor 46, and analyzes these images to determine whether or not a user is pointing at the screens 12. This may be done using any conventional image recognition technique, for example, using software that is trained to identify the shape associated with a hand 14 having an index finger 18 extended towards one of the screens 12. The central processor 42 then determines to where on the screens 12 the finger 18 is pointing. The central processor 42 may do this for one hand, or for as many hands as is deemed desirable. For example, the central processor 42 may determine this for as many hands as are pointing at the screen. The following description focuses on an example of a single finger 18, as it will be readily understood that the method may be repeated for as many fingers 18 as are desired or as are determined to be pointing at the screens 12. How the central processor 42 determines to where on the screen 12 the finger 18 is pointing may be done in different ways.

In one embodiment, the central processor 42 identifies the position of the tip of the index finger 18 within the x, y, z co-ordinate system. This may be done by triangulation from the images captured by the four cameras 16. Having identified the position of the tip of the index finger 18 from one set of four images, the next set of four images may be processed in the same way to determine the next position of the tip of the index finger 18. In this way, the tip of the index finger 18 may be tracked and its movement iterated forwards through time to determine the position where it would strike the screens 12 if its motion were to continue.

In an alternative embodiment, the images are analyzed to determine the extension of the index finger 18 and hence the direction in which the finger 18 points. Of course, this technique may be combined with the embodiment described above, for example to identify when the finger 18 is being moved in the direction in which it points as this may be interpreted as the finger 18 "pressing" an object displayed on the screens 12.

A processor as used herein, including central processor 42, image processor 46, or both, comprises hardware that may execute program instructions for software that implements the functionality of the illustrative embodiments. The processor may be a number of processors, a multi-processor core, or some other type of processor, depending on the particular implementation. A number, as used herein with reference to an item, means one or more items. Further, the processor may be implemented using a number of heterogeneous processor systems in which a main processor is present with secondary processors on a single chip. As another example, the processor may be a symmetric multi-processor system containing multiple processors of the same type.

The processes of the illustrative embodiments may be performed by the processor using computer implemented instructions. These instructions are referred to as program instructions, program code, computer useable program code, or computer readable program code that may be read and executed by the processor. The program code in the different embodiments may be embodied on different physical or computer readable storage media. Program code and the computer readable media on which it is stored may form a computer program product.

In another illustrative example, the processor may take the form of a hardware unit that has circuits that are manufactured or configured for a particular use. This type of hardware may perform operations without needing program code.

Figure 5A:
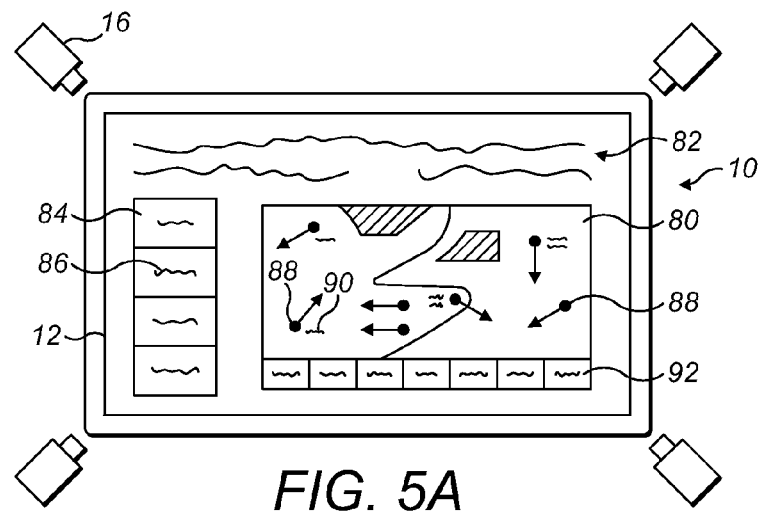
FIGS. 5A-5C are front views of a screen showing a zooming facility provided by a human machine interface according to an illustrative embodiment.
Figure 5B:
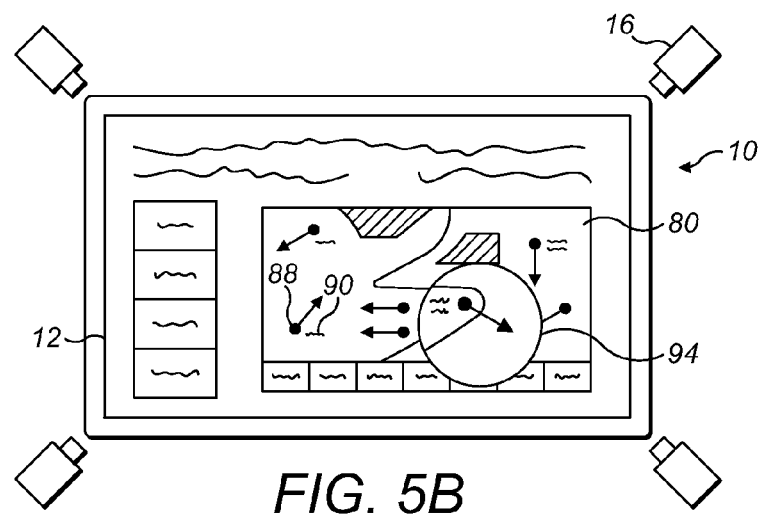
Figure 5C:
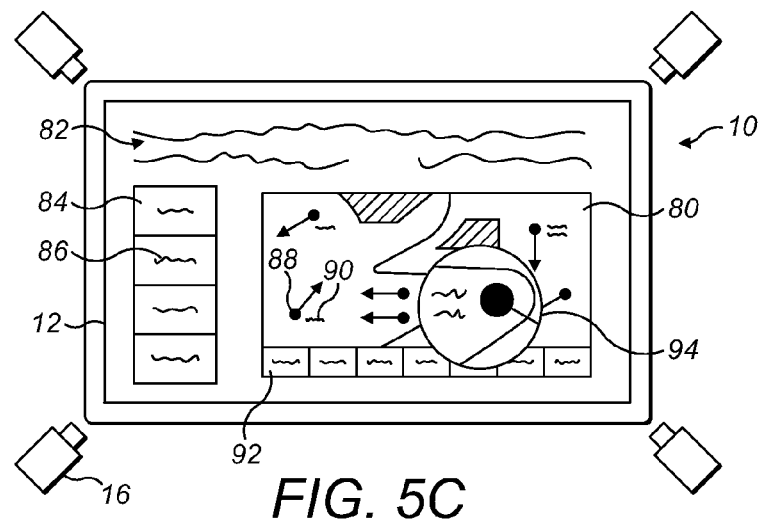

Turning to FIGS. 5A-5C, front views of a screen showing a zooming facility provided by a human machine interface according to an illustrative embodiment are presented. In this example, a single screen 12 is provided that is flanked by four cameras 16, as has already been described. The cameras 16 and screen 12 are linked to a computer system 10 that operates as previously described to provide a gesture-based human machine interface.

In the example shown in FIGS. 5A-5C, the screen 12 is displaying a map 80 and associated information. The top of the screen 12 carries header information 82. A column of four selectable buttons 84 is provided on the left hand edge of the screen 12. The buttons 84 may bear text 86 to denote a new screen of information that may be selected, or to change the information displayed on the map 80. The map 80 occupies the majority of the screen 12 and is positioned offset towards the lower right of the screen 12. The map 80 shows aircraft 88 as dots along with arrows to indicate their current direction of flight. Information to identify the aircraft 88 may also be displayed alongside the dots, as shown at 90. Further information is provided in a row of boxes 92 provided along the bottom edge of the map 80.

A user may want to zoom in on an aircraft 88 of interest on the map 80, for example to show underlying geographical information shown on the map 80 in greater detail. To do this, the user may point to one of the buttons 84 to select a zoom mode, and may then point to an aircraft 88 of interest on the map 80. As shown in FIGS. 5B and 5C, this causes the region at which the user is pointing to be displayed in a circle 94 at greater magnification. The circle 94 is displayed to overlie the background map 80. The edges of the zoomed circle 94 and the background map 80 may be merged if desired, as is well known in the art. To adjust the magnification factor, the user merely moves his or her index finger 18 towards or away from the screen 12, i.e. in the z-direction. Moving the index finger 18 towards the screen results in a greater magnification.

Thus, the x,y position of the user's finger 18 is used to determine the area on the map 80 that is magnified, while the z position of the finger 18 is used to determine the magnification. Upper and lower values for the z-position may be set to correspond to upper and lower magnification factors. For example, magnification may be set to 1 where a user's fingertip 18 is at least a certain distance, e.g. 30 cm, away from the screen 12. Also, a minimum separation from the screen, e.g. 5 cm, may be set as being the maximum magnification such that if the user's finger 18 comes closer than 5 cm to the screen 12, the magnification no longer increases. How the magnification varies between these distances may be chosen as desired. For example, the magnification may change linearly with distance or it may follow some other relationship, such as an exponential relationship.

FIGS. 5B-5C reflect a situation where, from a starting position in FIG. 5B, the user moves their index finger 18 closer to the screen 12 while pointing at an aircraft of interest 88 such that the magnification increases, as shown in FIG. 5C. Should the user move their finger 18 laterally as well as towards the screen 12, the magnification will increase and the magnified region will move to follow the lateral movement of the finger 18.

As will be apparent to those skilled in the art, modifications may be made to the embodiments described above without departing from the scope of the invention that is defined by the following claims.

For example, the number of screens 12 may be freely varied from one to any number. In addition, the type of screen 12 may be varied. For example, the screen 12 may be a flat screen like a plasma screen, LCD screen, OLED screen, or it may be a cathode ray tube, or merely a surface onto which an image is projected. Where multiple screens 12 are used, they need not be of a common type. The type of camera 16 used may also be varied, although CCD cameras are preferred. The cameras 16 may operate using visible light, but may use electromagnetic radiation at other wavelengths. For example, infra-red cameras may be used in low-light conditions.

The software may be trained to monitor any object and to determine what objects are being used to select information from a screen 12. For example, a user's finger 18 is described above. Alternatively, a pointing device such as a stick or wand may be used.

Illustrative embodiments may be used to access menus arranged in a tree structure very efficiently. For example, a finger 18 may be pointed at a button or a menu option presented on the screen 12 to bring up a new display of information on the screen 12. The user may then move their finger 18 to point to a further button or menu option to bring up another new display of information on the screen 12, and so on. Hence, merely moving a finger 18 such that it points to different parts of the screen 12 allows a user to navigate a tree menu structure very quickly.

The position of the user's finger 18 may be determined successively, for example by tracking the tip of the finger 18. This allows the speed of movement of the finger 18 to be determined. This speed may then be used to control the information on the screen 12. For example, speed of movement towards the screen 12 may be used, such that a gradual movement elicits a different response than a rapid movement. Lateral movement may also be used such that different speeds give different results. For example, a slow lateral movement may cause an object displayed on the screen 12 to be moved around within the screen, say a slow movement left to right may move an object from a central position to a position on the right hand edge of the screen 12. In contrast, a rapid movement may cause the object to be removed from the screen 12, say a rapid movement left to right may cause the object to fly off the right hand edge of the screen 12.

As noted above, the central processor 42 may monitor more than a single object like a user's finger 18. This allows multiple objects to be used to control information on the screen 12. A pair of objects may be used independently to interact with different controls on the screen, for example to select a new item and to change the type of information being associated with a selected item. The two objects may also be used together. An image displayed on the screen may be manipulated using both hands 14. An object displayed on a screen 12 may be rotated. For example, a user may put their hands at the same height with a finger 18 of each hand pointing to the left and right hand edges of an object displayed on the screen 12. By moving the left hand 14 towards the screen 12 and the right hand 14 away from the screen 12, the object may be made to rotate clockwise about a vertical axis. If one hand 14 is placed above the other, the object may be rotated about a horizontal axis. The axis of rotation may be defined to correspond to the line between the tips of the fingers 18.

The description of the different illustrative embodiments has been presented for purposes of illustration and description, and is not intended to be exhaustive or to limit the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of using a computer system through a gesture-based human machine interface, the method comprising:
    pointing to a position on a screen of the computer system using an object to point, wherein pointing includes maintaining a distance between the object and the screen, the distance being a positive value, and wherein the screen comprises outer corners and a center;
    capturing images of a space in front of the screen with at least four cameras configured to attach at the outer corners of the screen and point toward the center of the screen, wherein capturing images with the at least four cameras allows a three-dimensional map of the space in front of the screens to be constructed, the space including the object;
    analyzing the images using a processor to identify the object, to determine the position of the object in three-dimensions, to determine the position on the screen to which the object is pointing, to determine the distance between the object and the screen, and to determine speeds of movement of the object; and
    modifying information displayed on the screen in response to the determination of both the position on the screen to which the object is pointing and the distance between the object and the screen;
    wherein modifying the information displayed on the screen comprises magnifying the information displayed on a portion of the screen with a magnification that is dependent upon the determined distance between the object and the screen, wherein a zoom button is positioned at the position on the screen to which the object is pointing; wherein the determined distance is between a maximum value and a minimum value, wherein the magnification scaling varies exponentially as the determined distance varies between the maximum value and the minimum value; and wherein a gradual speed of movement of the object towards a menu option presented on the screen is interpreted as a single click and a rapid speed of movement of the object towards the menu option presented on the screen is interpreted as a double click.

2. The method of claim 1, wherein determining the position on the screen to which the object is pointing comprises tracking movement of the object.

3. The method of claim 1, wherein determining the position on the screen to which the object is pointing comprises determining an extension of the object toward the screen.

4. The method of claim 1 further comprising:
    pointing to positions on the screen of the computer system using two objects to point;
    analyzing the images using the processor to identify the two objects, to determine screen positions relative to the two objects and the at least four cameras, the screen being a reference plane for determining the positions on the screen to which the two objects are pointing, and to determine distances of the two objects from the screen; and
    modifying the information displayed on the screen in response to the determination of both the positions on the screen to which the two objects are pointing and the distances of the two objects from the screen.

5. The method of claim 1, wherein the object is an extended finger of a user's hand.

6. The method of claim 1, wherein to adjust the magnification, the object is moved towards or away from the screen in a z-direction and moving the object towards the screen results in a greater magnification;
    wherein an x, y position of the object determines an area on the screen that is magnified, and a z-position of the object determines the magnification;
    wherein upper and lower values for the z-position are set to correspond to upper and lower magnification factors;
    wherein magnification is set to 1 where the object is at least a certain distance, about 30 cm, away from the screen;
    wherein a minimum separation from the screen, about 5 cm, is set as being the maximum magnification such that if the object comes closer than the minimum separation to the screen, the magnification no longer increases; and
    wherein the magnification changes with an exponential relationship.

7. A method of using a computer system through a gesture-based human machine interface, the method comprising:
    pointing to a position on a screen of the computer system using an object to point, wherein pointing includes maintaining a distance between the object and the screen, the distance being a positive value, and wherein the screen comprises outer corners and a center;
    capturing images of a space in front of the screen with at least four cameras configured to attach at the outer corners of the screen and point toward the center of the screen, wherein capturing images with the at least four cameras allows a three-dimensional map of the space in front of the screens to be constructed, the space including the object;
    analyzing the images using a processor to identify the object, to determine the position of the object in three-dimensions, to determine the position on the screen to which the object is pointing, and to determine the distance between the object and the screen;
    modifying information displayed on the screen in response to the determination of both the position on the screen to which the object is pointing and the distance between the object and the screen;
    analyzing the images using the processor to determine speeds of movement of the object; and
    modifying the information displayed on the screen differently according to different speeds of movement of the object;
    wherein a gradual speed of movement of the object towards a menu option presented on the screen is interpreted as a single click and a rapid speed of movement of the object towards menu option presented on the screen is interpreted as a double click;

wherein when movement of the object is a slow lateral movement causes an object displayed on the screen to be moved around within the screen;

wherein when movement of the object is a rapid movement causes the object displayed on the screen to be removed from the screen; and wherein modifying the information displayed on the screen further comprises magnifying the information displayed on a portion of the screen to which the object is pointing with a magnification that is dependent upon the determined distance between the object and the screen, wherein the determined distance is between a maximum value and a minimum value, and wherein the magnification scaling varies exponentially as the determined distance varies between the maximum value and the minimum value.

8. The method of claim 7 further comprising:

analyzing the images using the processor to determine a speed of movement of the object away from the screen; and modifying the information displayed on the screen in response to the determination of the speed of movement of the object towards or away from the screen; wherein lateral movement is used such that different speeds give different results;

wherein the slow lateral movement is a slow movement left to right moves the object displayed on the screen from a central position to a position on a right hand edge of the screen; and wherein the rapid movement is a rapid movement left to right that causes the object displayed on the screen to fly off the right hand edge of the screen.

9. The method of claim 7 further comprising:

analyzing the images using the processor to determine a speed of movement of the object laterally in front of the screen; and modifying the information displayed on the screen in response to the determination of the speed of movement of the object.

10. An apparatus comprising:

a screen operable to display information, wherein the screen comprises outer corners and a center;

at least four cameras configured to attach at the outer corners of the screen and point toward the center of the screen to capture images of a space in front of the screen, wherein capturing images with the at least four cameras allows a three-dimensional map of the space in front of the screens to be constructed, and a processor configured to:

receive the images, analyze the images to identify an object pointing at a position on the screen, to determine a screen position relative to the object and the at least four cameras, the screen being a reference plane for determining the position on the screen to which the object is pointing, to determine a distance of the object from the screen, the distance being a positive value, and to determine speeds of movement of the object, and modify the information displayed on the screen in response to the determination of both the position on the screen to which the object is pointing and the distance of the object from the screen;

wherein modifying the information displayed on the screen comprises magnifying the information displayed on a portion of the screen with a magnification that is dependent upon the determined distance between the object and the screen, wherein a zoom button is positioned at the position on the screen to which the object is pointing; wherein the determined distance is between a maximum value and a minimum value, wherein the magnification scaling varies exponentially as the determined distance varies between the maximum value and the minimum value; and wherein a gradual speed of movement of the object towards a menu option presented on the screen is interpreted as a single click and a rapid speed of movement of the object towards the menu option presented on the screen is interpreted as a double click.

11. The apparatus of claim 10, wherein the processor is configured to analyze the images to track movement of the object to determine the position on the screen to which the object is pointing.

12. The apparatus of claim 10, wherein the processor is configured to analyze the images to determine an extension of the object toward the screen to determine the position on the screen to which the object is pointing.

13. The apparatus of claim 10, wherein the processor is configured to magnify the information displayed on a portion of the screen to which the object is pointing with a magnification that is dependent upon the determined distance of the object from the screen.

14. The apparatus of claim 10, wherein the object is an extended finger of a user's hand.

15. An apparatus comprising:

a screen operable to display information, wherein the screen comprises outer corners and a center;

at least four cameras configured to attach at the outer corners of the screen and point toward the center of the screen to capture images of a space in front of the screen, wherein capturing images with the at least four cameras allows a three-dimensional map of the space in front of the screens to be constructed, and a processor configured to:

receive the images, analyze the images to identify an object pointing at a position on the screen, to determine a screen position relative to the object and the at least four cameras, the screen being a reference plane for determining the position on the screen to which the object is pointing, and to determine a distance of the object from the screen, the distance being a positive value, and modify the information displayed on the screen in response to the determination of both the position on the screen to which the object is pointing and the distance of the object from the screen, and determine a speed of movement of the object and to modify the information displayed on the screen in response to the determination of the speed of movement, wherein a gradual speed of movement of the object towards a menu option presented on the screen is interpreted as a single click and a rapid speed of movement of the object towards the menu option presented on the screen is interpreted as a double click;

wherein modifying the information displayed on the screen comprises magnifying the information displayed on a portion of the screen to which the object is pointing with a magnification that is dependent upon the determined distance between the object and the screen, wherein the determined distance is between a maximum value and a minimum value, and wherein the magnification scaling varies exponentially as the determined distance varies between the maximum value and the minimum value.

16. A gesture-based human interface of a computer system, the interface being a computer program product stored on a non-transitory storage medium in the computer system, and further comprising:
a first computer program product module configured to enable a screen operable to display information, wherein the screen comprises outer corners and a center;
a second computer program product module configured to instruct at least four cameras configured to attach at the outer corners of the screen and point toward the center of the screen to capture images of a space in front of the screen; and
a third computer program product module configured to control a processor configured to:
receive the images,
analyze the images to identify an object pointing at a position on the screen, to determine a screen position relative to the object and the at least four cameras, the screen being a reference plane for determining the position on the screen to which the object is pointing and for determining a distance of the object from the screen, the distance being a positive value, and to determine a speed of movement of the object, and
modify the information displayed on the screen in response to the determination of the position on the screen to which the object is pointing, the distance of the object from the screen, and the speed of movement;
wherein modifying the information displayed on the screen comprises magnifying the information displayed on a portion of the screen to which the object is pointing with a magnification that is dependent upon the determined distance between the object and the screen, wherein the determined distance is between a maximum value and a minimum value, and wherein the magnification scaling varies exponentially as the determined distance varies between the maximum value and the minimum value; and
wherein a gradual speed of movement of the object towards a menu option presented on the screen is interpreted as a single click and a rapid speed of movement of the object towards the menu option presented on the screen is interpreted as a double click.

17. The interface of claim 16, wherein the processor is configured to magnify the information displayed on a portion of the screen to which the object is pointing with a magnification that is dependent upon the determined distance of the object from the screen.

18. The interface of claim 16, wherein the object includes an extension of a finger used to determine to where on the screen a user is pointing.

19. The interface of claim 16, wherein the processor is configured to analyze the images to determine an extension of the object toward the screen to determine the position on the screen to which the object is pointing.

20. The interface of claim 16, wherein the processor is configured to analyze the images to track movement of the object to determine the position on the screen to which the object is pointing.

* * * * *